Aug. 14, 1928.
J. ROBINSON
1,681,050
SPRING SUSPENSION OR SHOCK ABSORBER FOR VEHICLES
Filed Nov. 19, 1923 2 Sheets-Sheet 1
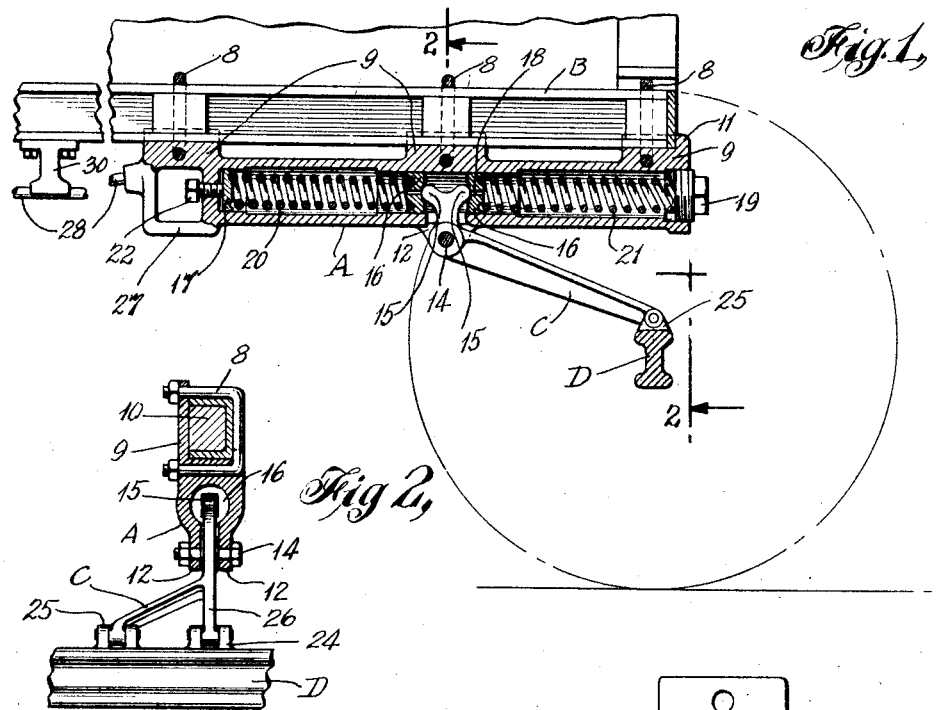
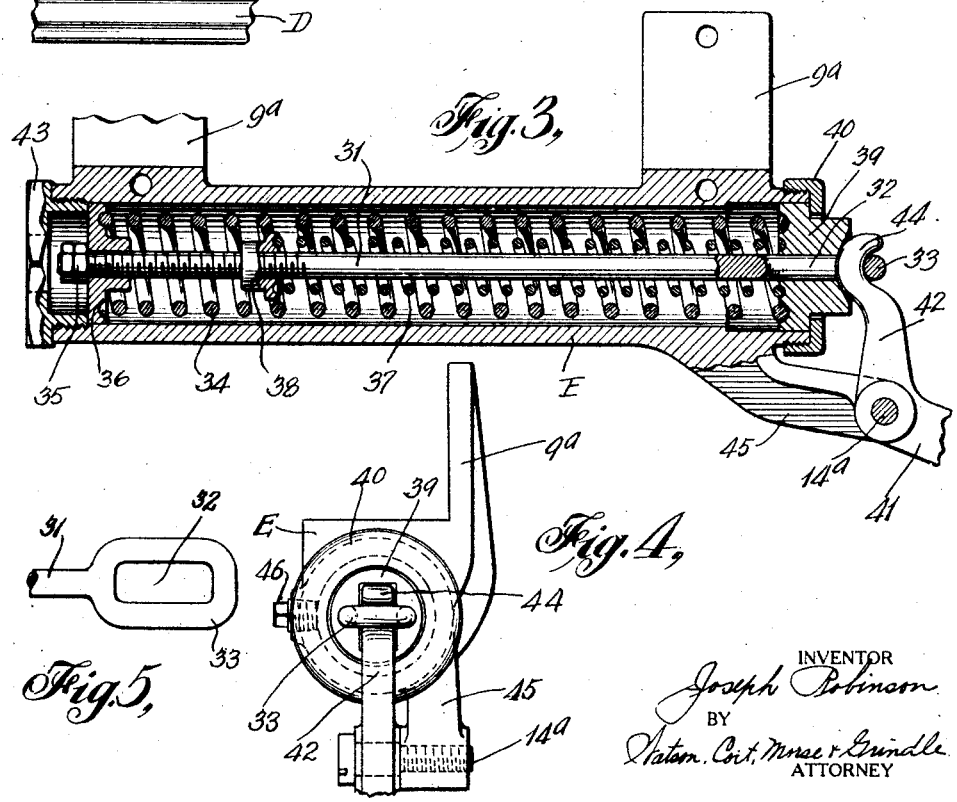
INVENTOR
Joseph Robinson
BY
Slaton, Coit, Morse & Grindle
ATTORNEY Aug. 14, 1928.　　　　　　　　　　　　　　　1,681,050
J. ROBINSON
SPRING SUSPENSION OR SHOCK ABSORBER FOR VEHICLES
Filed Nov. 19, 1923　　　　2 Sheets-Sheet 2
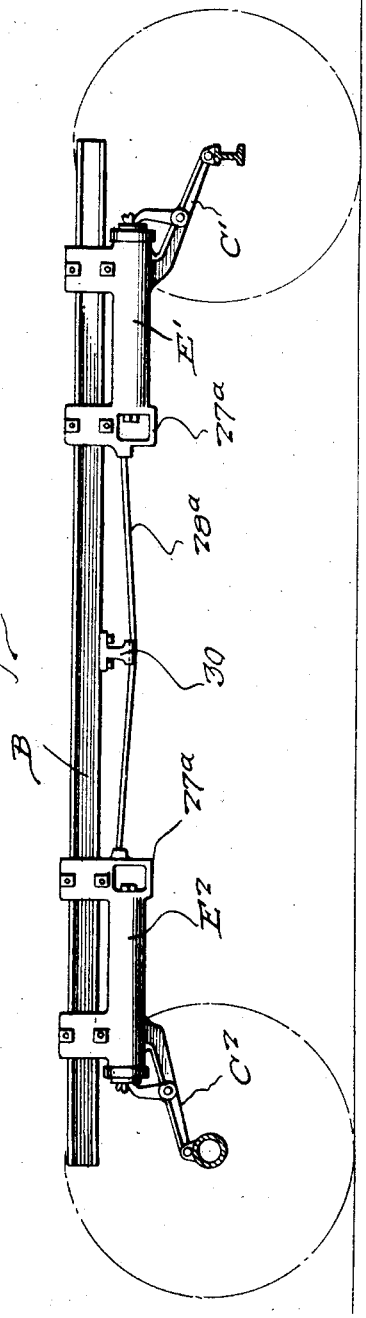
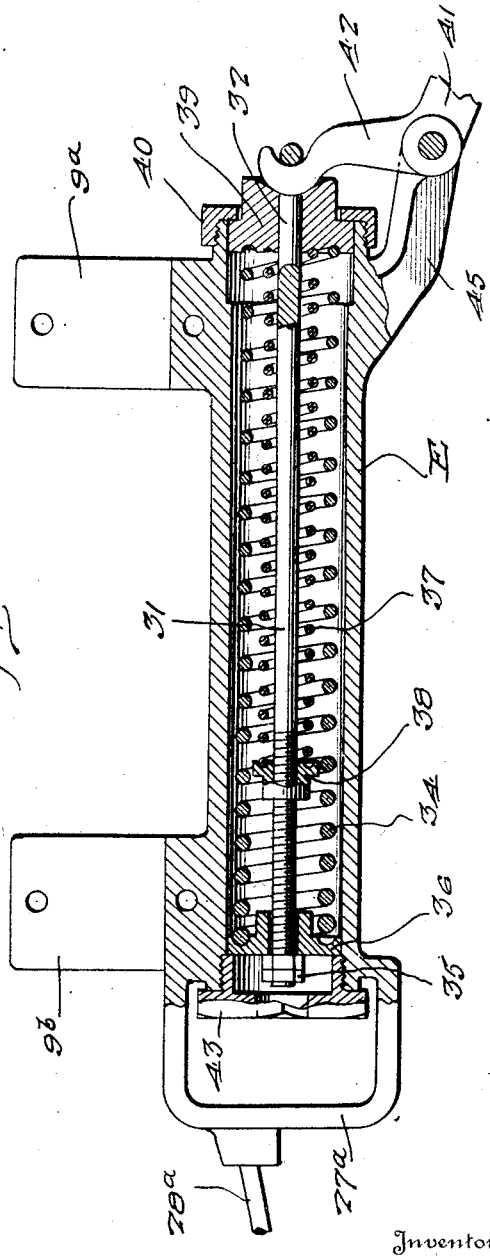
Inventor
Joseph Robinson
By Russel S. Smart
Attorney Patented Aug. 14, 1928.

1,681,050

UNITED STATES PATENT OFFICE.

JOSEPH ROBINSON, OF SANTA MONICA, CALIFORNIA, ASSIGNOR, BY MESNE ASSIGNMENTS, TO RUSSELL SUTHERLAND SMART, OF OTTAWA, CANADA.

SPRING SUSPENSION OR SHOCK ABSORBER FOR VEHICLES.

Application filed November 19, 1923. Serial No. 675,759.

My invention relates to spring suspensions or shock absorbers for vehicles of various kinds, and for automobiles in particular. While it is adapted for use as a shock absorber in connection with the conventional type of automobile springs, I preferably employ it as a substitute for the latter. The objects of the invention are to produce a simple and rugged construction of its kind which will be low in manufacturing cost, easy to apply, and very efficient.

Further objects are to enable an economy in space to be effected by enclosing the rebound checking spring within and opposed in action to the load supporting spring, and to generally improve and simplify the construction of the device to better adapt it to perform the functions required of it.

The invention is fully described in the following specification, pointed out in the appended claims, and illustrated in the accompanying drawings in which Figure 1 is a sectional side view of my improvement as applied to the front axle of an automobile.

Figure 2 is a sectional elevation taken on the line 2—2 of Figure 1.

Figure 3 is a sectional side view of a modification of my improvement. In this view a part of the rocker or arm C is broken away.

Figure 4 is a front elevation of the structure shown in Figure 3, and

Figure 5 is a sectional plan view of the forward end of the rod 31.

Figure 6 is a sectional elevation of a form of the invention embodying certain features of both the modifications shown in the preceding views.

Figure 7 is a side elevation showing part of the chassis and the method of attaching my improved devices thereto.

My improvement may be applied to any type of vehicle. I show it as applied to the Ford automobile. A barrel A is rigidly secured to the frame or channel iron B of the vehicle in any suitable manner, as by the clamps 8, which pass through openings therefor in lugs 9. The lugs are formed integrally with the barrel A, and snugly fit one side and the bottom of the car frame or channel iron B as shown. A wood or other suitable filler 10 is placed in the channel iron and is gripped by the clamps 8, as shown in Figure 2. This is to prevent the barrel slipping along the frame B. Further provision for this purpose is provided by a lip 11 on the front end of the barrel A, and hooking it over the front end of the frame B. Approximately midway the ends of the barrel A, I provide one or more downwardly extending powerful lugs 12 having a suitable bearing formed at the lower end thereof in which a rocker or arm C is pivotally mounted as by the pin 14. The upper end of the arm C is provided with portions 15 which rest in complementary sockets formed in the follower blocks 16. The barrel A is filled with a suitable heavy lubricant and an opening 18 is provided to permit the lubricant to work through and lubricate the bearing between the portions 15 and the blocks 16. The co-operating surfaces of the barrel and the blocks are machined and the parts fit fairly close to prevent excessive working out of the lubricant therearound. One end of the barrel is closed by a plug 19 threaded therein, while suitable coiled springs 20 and 21, preferably of the type shown, are interposed between the blocks 16 and the adjacent ends of the barrel A, the spring 20 being the main or supporting spring, and the spring 21 being the check spring—that is, the spring which takes the rebound. The springs may, if desired, be of different power. It will be observed that the spring 20 is coiled of a gradually tapering bar. This construction produces an highly efficient cushion spring which offers a resistance to road shocks that increase in greater progression than the extent of the compressional movement of the spring. In this manner the spring is caused to give a resistance very similar to that offered by air when being compressed. An easy and comfortable cushion results.

A plate 17 and an adjustment set screw 22 are provided for varying the compression of the springs 20 and 21, and for adjusting the car body vertically. If, for instance, the set screw 22 is turned forward, the body of the car will be raised.

The lower part of the arm C is forked, as shown in Figure 2, and is suitably pivoted at 24 and 25 to the axle D of the car, pivot 25 being the pivot stud already on the Ford car, from which stud the usual Ford spring has been removed and the stud turned to face towards the rear of the car. Of course, the fork 26 of the arm may be eliminated if desired.

While the barrel A may be positioned at any point laterally or longitudinally of the frame B, I preferably position it as shown, and form integrally with the rear end of the barrel a yoke 27 which threadingly receives a strut or brace rod 28 carrying wherever desired the usual turnbuckle (not shown). A suitable saddle or brace member 30 is interposed between the rod 28 and the bottom of the frame B to support the frame against sagging or bending. There being one of my improved spring suspensions at each corner of the car frame the rod 28 ties them together in pairs, each pair being made up of the two suspensions that are located on the same side of the car. In this manner the application of my improvement is made very rigid with the maximum resistance to shocks and vibrations, and the car frame B is greatly reinforced.

In Figures 3 and 4, I show a modification of my improvement. In this construction the forward end of the barrel A and the spring 21 are omitted. The sleeve or bracket E is clamped to the car frame B as in the case of the construction illustrated in Figure 1, or the lugs may be put on the opposite side of the sleeve, as shown at 9ª. A tie rod 31 having an oblong opening 32 in its head 33 lies within the main spring 34, and is suitably secured, as by a nut 35, to a plate or washer 36 against which the rear end of the spring 34 rests. The rod may be rigid with the plate 36 or it may have sliding engagement therewith, as shown in Figure 6. Surrounding the rod 31 and lying within the spring 34, I provide a second spring 37 secured against movement on the rod by an abutment 38. A block or follower 39 is mounted at the forward end of the sleeve or housing E, and normally rests against a flange 40 formed on or separately of the sleeve. The block is provided with an opening through which as shown the head 33 of the rod 31 slidingly passes. An arm or rocker member 41 of the same form (except as to the upper end 42 thereof) as arm C heretofore described, is provided and is pivoted in lugs in the same manner as in the construction shown in Figure 1, or it may be pivoted by a pin 14ª to a single lug 43 as shown in Figure 4. The upper end 42 of the arm is provided with a head 44 which engages the block 39 and over which is hooked the eye 33 of the rod 31. The opening 32 in the rod is of sufficient length to permit the required rearward movement of the member 42, independent of any movement of rod 31, in traversing a rough road. A nut or cap 43 is threaded to the rear end of the sleeve, and has an opening therein through which the nut 35 may be adjusted to vary the compression of the spring 34, and the vertical position of the car body or frame B regulated.

The sleeve E is filled, through the opening 46, with a suitable lubricant, as in the case of the construction shown in Figure 1, and this lubricant in part works through the opening in the block 39, and lubricates the joint between the block and the eye 42 of the arm 41. When my improvement is constructed according to this modification thereof, the spring 34 takes both the initial shock and the rebound, and the second spring 37 serves to assist in both of these functions or, in the modification shown in Figure 6 in rebound alone depending upon whether the rod 31 is rigid with the washer 36 and whether the nut 35 has been removed. Such removal is contemplated where it is desired to reduce the resistance to rebound. The spring 37 may, of course, be eliminated altogether if desired.

It will be understood that the springs employed in my improvement must be of such power as to properly support the weight of the particular vehicle on which they are to be used, and that the rocker arms C and 41 may be of any shape desired to obtain the preferred position of the car body with respect to the axles D.

It will be observed that by locating the rebound checking spring (37) within and opposed in action to the load supporting spring (34), a considerable economy in space is effected and furthermore, that the releasable means by which the rod or connecting device (31) is connected to one or both of the springs enable either one or both springs to be used to effect the rebound checking. It will be also observed that the point of connection of the springs to the rod (31) is adjustable by means of members (36) and (38).

Barrel A and frame B either together or separately may be looked upon in the nature of a supporting member for the springs and operative parts of the device. The rocker-arm C or (41), it will be observed, forms the connection between the axle D and the spring mechanism. Either of these members, which are in the nature of connecting members, is subject to the continuous pressure of the load supporting and rebound check springs whereby a continuous resilient support is obtained.

The form of the invention shown in Figure 6 is generally similar to that shown in Figures 3 and 4. The supporting member "E," load supporting spring (34), rebound checking springs (37), connecting member or arm (41) with the connecting rod (31) being of the same construction and similarly lettered. In this view, the size of the load supporting spring has been somewhat exaggerated to show more clearly the gradual taper in the size of the bar from which the load spring (34) is coiled. The plate or washer (36) is also shown disconnected from the rod (31) which is therefore free to slide through said plate or washer. It will be seen that if the nuts (35) are removed then on the reverse movement of the connecting member resistance will be offered only by the rebound checking spring (37).

It will also be observed that the resistance offered by the load supporting spring approaches a minimum as the connecting member (41) approaches normal position thus insuring that transition of the load from the load supporting spring of the rebound checking spring will be under graduated resistance.

One of the lugs (9$^b$) for the supporting member (E) in this form of the invention is shown with a yoke (27$^a$) similar to the yoke (27) in Figure 1 and designed to be connected to a brace or tie rod (28$^a$) similar in form and purpose to the corresponding parts shown in Figure 1.

Referring to Figure 7, E′ and E$^2$ indicate supporting members at opposite ends of the chassis (B), the connecting members or rocker arms C′ and C$^2$ of which are connected to the front and rear axle respectively.

The yokes (27$^a$) on the connecting members E′ and E$^2$ are united by the tie rod (28$^a$) which is connected to them as shown in Figure 6 at a point somewhat removed from the point at which the bracket or connecting members are connected to the chassis, such tie rod or brace (28$^a$) extending over the strut or brace bracket (30) mounted on the chassis.

What I claim is:

1. A device of the character described comprising in combination a supporting member adapted to be secured to the chassis of a vehicle; a pivoted rocker-arm pivoted intermediate its ends on the supporting member, and having one end connected to the axle of a vehicle, a supporting spring acting on the other end of the lever, said spring being so designed that its resistance to movement will increase in greater progression than the extent of its compressional movement; and a rebound checking spring connected to the side of said other end of the rocker-arm opposite to that to which the load supporting spring is connected.

2. A device of the character described comprising, in combination, a plurality of supporting members designed to be secured to the chassis of a vehicle, pivoted rocker arms, load supporting and rebound checking springs on the supporting members operatively connected to each rocker arm, means connecting the supporting members at points removed from the points at which they are connected to the chassis, and a strut adapted to brace the said connecting means.

In testimony whereof I hereunto affix my signature.

JOSEPH ROBINSON.